United States Patent [19]

Duffy

[11] 4,378,030

[45] Mar. 29, 1983

[54] POWER STEERING GEAR MECHANISM WITH ROTARY CONTROL VALVE

[75] Inventor: James J. Duffy, Livonia, Mich.

[73] Assignee: Ford Motor Company, Dearborn, Mich.

[21] Appl. No.: 230,140

[22] Filed: Jan. 30, 1981

Related U.S. Application Data

[63] Continuation of Ser. No. 62,086, Jul. 30, 1979.

[51] Int. Cl.³ .............................................. F15B 13/16
[52] U.S. Cl. ............................ 137/625.24; 91/375 A
[58] Field of Search ................... 91/375 A, 368, 467; 180/132; 137/625.24

[56] References Cited

U.S. PATENT DOCUMENTS

| | | | |
|---|---|---|---|
| 3,022,772 | 2/1962 | Zeigler et al. | 91/375 A |
| 3,145,626 | 8/1964 | Vickers et al. | 91/375 A |
| 3,998,131 | 12/1976 | Adams | 91/375 A |
| 4,063,490 | 12/1977 | Duffy | 91/375 A |

FOREIGN PATENT DOCUMENTS 1535722 12/1978 United Kingdom ................ 180/132

Primary Examiner—Paul E. Maslousky
Attorney, Agent, or Firm—Donald J. Harrington; Keith L. Zerschling

[57] ABSTRACT

A power steering gear mechanism comprising a pinion adapted to be connected drivably to the steering gear linkage for a road vehicle, a pressure cylinder, a double acting piston movable in said cylinder and defining therewith a pair of pressure chambers, said piston being connected to or having formed thereon a gear rack that engages said pinion, a rotary valve mechanism having an internal rotatable valve element connected to a power input shaft, a valve sleeve adapted to be connected and to be rotatable with said pinion, fluid porting in said sleeve for distributing working pressure to either pressure chamber as a result of rotary displacement of said valve element with respect to said valve sleeve, the porting being arranged such that high pressure fluid in the porting establishes on said sleeve a force that urges said sleeve toward said pinion, the low pressure outlet port on said sleeve being situated at the end of said valve sleeve adjacent said pinion.

1 Claim, 7 Drawing Figures

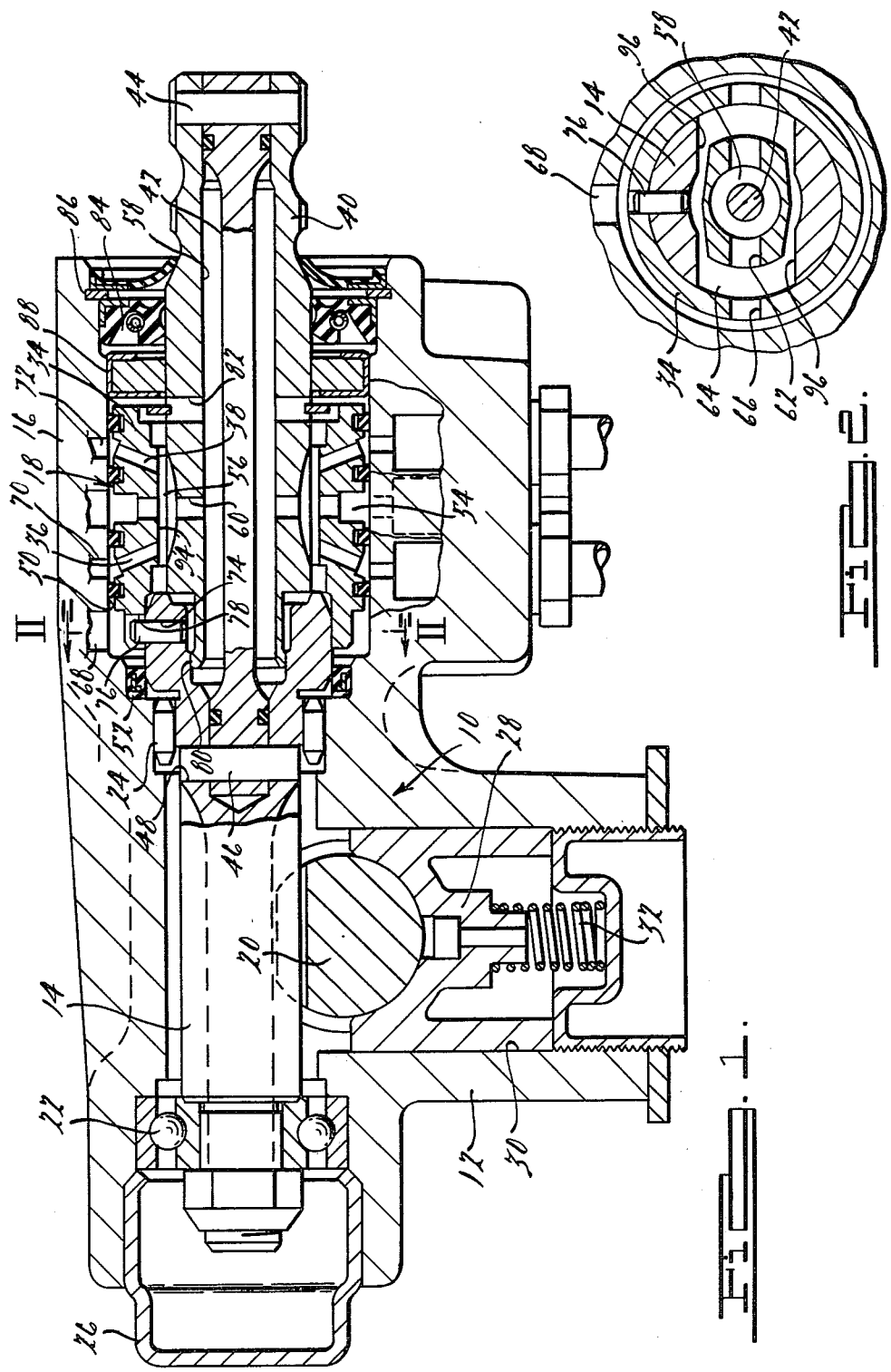

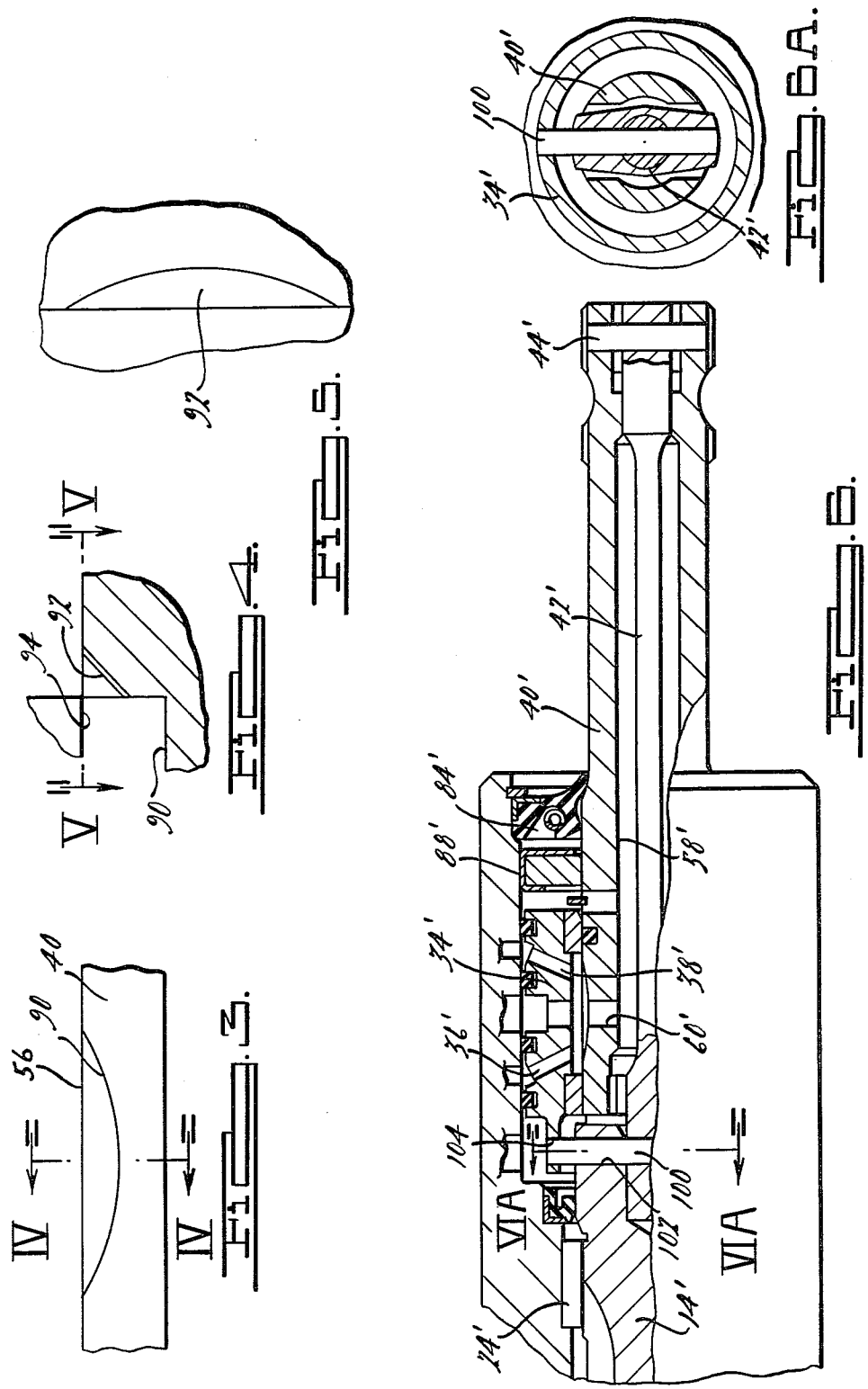

POWER STEERING GEAR MECHANISM WITH ROTARY CONTROL VALVE

RELATED DISCLOSURE

This application is a continuation of application Ser. No. 062,086, filed July 30, 1979, titled "Power Steering Gear Mechanism with Rotary Control Valve".

GENERAL DESCRIPTION OF THE INVENTION

My invention relates generally to power steering gear mechanisms for use with automotive vehicles. It comprises a pressure movable member defining a piston that is located in a pressure cylinder. The piston and the cylinder cooperate to define two working pressure chambers, one on each side of the piston. The piston is provided with rack teeth that engage a pinion that in turn is connected operatively to the steering gear linkage for the dirigible wheels of the vehicle.

A driver controlled torque input member is journalled in the cylinder housing and is situated in coaxial alignment with the piston. It is connected to a driven member of the steering gear mechanism by a torsion bar so that the input member may deflect angularly with respect to the driven member. The driven member in turn is connected to the pinion so that steering torque applied to the input shaft will be translated into a driving motion of the piston and the rack teeth in either one direction or the other depending upon the direction that torque is applied to the input shaft.

A pressure source, such as an engine driven power steering pump, not disclosed, distributes working pressure to the pressure chambers. Pressure distribution to the chambers is controlled by a rotary valve that comprises a first valve element connected to or formed integrally with a torque input shaft. This valve element is rotatably disposed in a valve sleeve located within a valve housing at one end of the cylinder housing. The valve sleeve is ported so that fluid pressure may be admitted to a central region of the registering valve lands of the valve element and the sleeve. On either side of the inlet port is a high pressure distribution port extending to either pressure chamber. Fluid is circulated continuously through the valve system, and the outlet for the circulating fluid is an outlet port located at the end of the valve spool adjacent the pinion.

My invention comprises improvements in a steering gear valve mechanism of the type that is disclosed in U.S. Pat. Nos. 3,680,443; 3,807,456 and 4,063,490 the latter being issued to me and assigned to the assignee of my present invention. The valve structure shown in U.S. Pat. No. 4,063,490 includes a valve sleeve within which is situated a rotary valve element. The sleeve is provided with porting that establishes communication between the high pressure inlet port and each of two pressure distribution chambers in a power steering gear. The outlet port is located at the rearward end of the valve structure. The valve sleeve is pinned to the driven member and axial thrust forces are transmitted from the driven member to the case through thrust bearings. Unlike the valve arrangement of U.S. Pat. No. 4,063,490, my present invention does not require a positive pinned connection between the sleeve and the driven member but instead includes a loose pin and slot connection that allows for free-floating movement of the sleeve in the surrounding valve housing with a minimum friction. The pressure forces acting on the sleeve tend to urge the valve sleeve towards the driven member and the pinion thereby eliminating the need for using thrust washers for transmitting to the housing the forces acting on the sleeve. This distinction between my earlier structure and my present structure applies also to other prior art devices of which I am aware, including the devices disclosed in the patents mentioned above.

My improved design makes assembly of the valve mechanism much simpler. If, as in some prior art designs, the sleeve is restrained by a pin that extends through a diametral opening in the driven member, the sleeve can be assembled only by offsetting the pin during assembly so that it clears the top of the pin carried by the output member. This requires an increased inside diameter for the sleeve in order to permit the eccentric positioning of the sleeve with respect to the output member that is necessary to provide clearance with respect to the pin. This increased inside diameter of the sleeve can be achieved by using a thin wall at the front end of the sleeve. Location of the front sleeve seal ring at that region becomes difficult without lengthening the sleeve and the valve design itself. If the drive pin is assembled in the output member after the sleeve is located in place, the manufacturing feasibility is substantially reduced so that this design approach is impractical.

The pin for the pin connection between the sleeve and the output member of my present design causes the pin to be loaded in shear rather than bending and thus will transmit a greater turning force without failure.

According to a second embodiment of my invention, a pin connection is provided between the torsion bar and the output member, and the pin of that pin connection is used also to establish a driving connection between the output member and the valve spool. The pin thus serves a double purpose and the axial length of the valve assembly is reduced because the need for providing two pin connections is eliminated. This improved construction also makes it possible to establish the pin connection at a location that is relatively remote from the bearing point for the output shaft so that the bearing length can be surface hardened. If the hole for the pin connection between the output member and the torsion bar were to be located relatively close to the bearing point of the output member as in certain prior art designs, drilling of the hole for the pin connection would be difficult from a manufacturing standpoint.

The registering valve portions for the sleeve and the valve element are relatively displaceable, one with respect to the other, upon deflection of the torsion bar that connects the torque input member with the driven member. The deflection of the torsion bar is proportional to the torque applied to the steering gear which, of course, is directly proportional to the steering effort applied to the pinion. The magnitude of the displacement of the torsion bar determines the relative displacement of the valve portions of the sleeve of the valve element. As torque is applied in one direction, the degree of communication between the inlet port and the right turn port extending to one pressure chamber is increased as corresponding pressure distribution from the inlet port to the left turn port extending to the opposite pressure chamber is decreased. The thrust due to pressure forces acting on the valve sleeve is in the direction of the pinion. No thrust washer is required to accommodate transfer of thrust forces from the sleeve to the housing as in conventional arrangements. A pin and slot connection is provided between the driven member and the sleeve so that the driven sleeve rotates with the driven member with a free floating relatively frictionless movement.

BRIEF DESCRIPTION OF THE FIGURES OF THE DRAWINGS

FIG. 1 is an assembly view of a steering gear mechanism that includes a rotary pressure distribution valve embodying the improvements of my invention.

FIG. 2 is a cross-sectional view of the rotary pressure distribution valve for the steering gear of FIG. 1 as seen from the plane of section line II—II of FIG. 1.

FIG. 3 is an enlarged view of a portion of the rotary valve mechanism of FIG. 2.

FIG. 4 is a cross-sectional end view of the valve FIG. 3 as seen from the plane of section line 4—4 of FIG. 3.

FIG. 5 is a plan view of the valve structure of FIG. 4 as seen from the plane of section line 5—5 of FIG. 4.

FIG. 6 is a cross-sectional view of an alternate rotary valve design for the steering gear of FIG. 1.

FIG. 6A is a cross-sectional view of the valve mechanism of FIG. 6 as seen from the plane of section line 6A—6A of FIG. 6.

PARTICULAR DESCRIPTION OF THE INVENTION

In FIG. 1 reference numeral 10 generally designates a cast housing. It includes a portion 12 that encloses a rack pinion 14 and a portion 16 that encloses a valve assembly 18. The pinion 14 engages drivably a rack 20 which extends transversely with respect to the axis of the pinion 14 and is suitably journalled. Reference may be made to U.S. Pat. No. 4,063,490 for a description of one method for enclosing and supporting a rack such as the rack 20.

Pinion 14 is journalled at the left-hand end, as seen in FIG. 1, by bearing 22 which is capable of accommodating axial thrust in either axial direction. The right-hand end of the pinion, as seen in FIG. 1, is journalled by bushing 24. Closure member 26 enclosing the left-hand end of the opening in the housing 10 in which the pinion 14 is journalled.

The rack 20 is adapted to be connected to the steering linkage of the dirigible wheels of a road vehicle. It is urged into meshing engagement with a pinion 14 by yoke 28 slidably positioned in a yoke cavity 30 formed in the housing portion 12. The yoke 28 is urged into sliding engagement with the rack 20 by means of compression spring 32.

The valve structure 18 includes a sleeve 34 which is provided with a first high pressure port 36 and a second high pressure port 38 which communicate respectively with the left turn pressure chamber and the right turn pressure chamber for the power booster cylinder. Reference may be made to U.S. Pat. No. 4,063,490 for a showing of a power cylinder and piston mechanism capable of being used with the structure of FIG. 1. The rack 20 is connected to and is formed integrally with the piston in a steering mechanism so that when pressure is distributed in the power cylinder to one side of the piston the rack 20 is urged in one direction. It is urged in the opposite direction if the pressure build up occurs on the opposite side of the piston. In this way hydraulic power assist is achieved. This supplements the steering effort applied to the rack through the pinion 14.

A torque input shaft 40 is received within the sleeve 34. The shaft 40 is hollow and it receives therethrough a torsion bar 42 which is pinned by means of a pin and slot connection 44 to the outboard end of the shaft 40. The inboard end of the torsion rod 42 is pinned by a pin-and-slot connection to the output member of which the pinion 14 forms a part. The output member is provided with an opening 48 through which the pin 46 is received.

The sleeve 34 is positioned in a cylindrical opening 50 formed in the housing portion 16. A fluid seal 52 is situated on the output member and against a shoulder formed in the housing portion 16.

A high pressure fluid inlet port 54 formed in the sleeve 16 extends radially inward toward valve lands 56 formed on the input shaft 40. The bases of the valve lands 56 communicate with a central bore 58 in the input shaft 40 through a radial passages 60.

The bore 58 communicates through passage 62, as seen in FIG. 2, with space 64 between the input shaft 40 and the left-hand end of the sleeve 34. The sleeve 34 is ported at 66 so that it communicates with return passage 68 formed in the housing 16.

Ports 36 and 38 communicate respectively with left turn working pressure passage 70 and right turn working pressure passage 72, respectively. These pressure passages extend to opposite sides of the piston for the fluid motor of which the power cylinder forms a part.

The pinion 14, which also may be referred to as a driven member, is provided with a radial opening 74 in which is positioned drive pin 76. The radially outward end of the pin 76 is received in slot 78 formed in the left-hand end of the sleeve 34 so that the rotary motion of the pinion 14 will be followed by corresponding rotary motion of the sleeve 34.

The left-hand end of the input shaft 40 is piloted at 80 in a central cylindrical opening formed in the right-hand end of the pinion 14. The internal passage 58 in the input member 40 communicates through radial port 82 at the right hand side of the sleeve 34 so that the high pressure fluid in return passage 68 is transmitted directly to the right-hand end of the sleeve 34.

Fluid seal 84 is situated between the input shaft 40 and the right-hand end of the housing 16. It is held in place by snap ring 86. A spacer 88 is located between the sleeve 34 and the seal 84.

The sleeve 34 is provided with ring seals on either side of the port 36, on either side of the input port 54 and on either side of the right turn port 38.

FIG. 3 shows an enlargement of a valve land 56. The land is defined by a cavity 90 which comprises a milled slot in the input shaft 40. Several slots 90 are angularly disposed about the axis of the shaft 40.

The corners of the slots 90 are chamfered as seen in FIG. 4 at 92. The chamfer is defined by a crescent surface as indicated in the plan view of FIG. 5. The geometry of the chamfer and the geometry of the slots 90 are controlled so that sufficient valve clearance is provided to accommodate the flow of fluid through the valve mechanism and for the distribution of pressure to each of the pressure ports 36 and 38. A typical valve opening between an internal valve land 94 formed in the sleeve 34 and slot 90 is shown in FIG. 4. The valve lands 94 are in the form of axial flats situated in angularly disposed relationship about the axis of the sleeve 34 and these lands register with the lands 56 formed on the member 40.

When torque is applied to the torque input shaft 40 in one direction, torsion bar 42 yields thereby decreasing the opening between the lands 94 and 56 that communicate with one passage while the degree of communication through the lands with the other pressure passages is increased. This effects a turn in either a right direction or a left direction depending upon the direction of the torque applied to the shaft 40.

A valve mechanism provides a continuously open fluid circuit between the inlet port 54 and the outlet port 68 as previously described. The pressure that acts on the right-hand end of the valve sleeve 34 exceeds the pressure forces acting in a right-hand direction on the valve sleeve. Thus the valve sleeve is forced normally toward pinion 14. There is no necessity, therefore, to provide a thrust washer at the right-hand end of the valve sleeve.

The power assist provided by the power cylinder and piston assembly is in a direction that supplements the steering effort applied to the input shaft 40. The input shaft 40 is situated as shown in FIG. 2 within the right-hand end of the pinion or driven member 14. Input shaft 40 and member 14 have engageable parts that define a lost motion connection, which is identified by reference character 96. If the torsion rod 42 deflects beyond a certain angular extent, the lost motion connection at 96 will establish a direct driving relationship between the shaft 40 and the pinion 14.

In FIG. 6 I have shown an alternate valve construction that employs a single drive pin for connecting both the torsion rod and the valve sleeve to the driven member or pinion 14. The drive pin that serves this dual purpose is identified in FIG. 6 by reference numeral 100. The pins in the FIG. 2 construction that the drive pin 100 replaces are shown at 46 and 76. The pinion 14', which forms a counterpart for the pinion 14 of the FIG. 2 construction, is provided with an opening 102 through which the pin 100 is received. The radially outward end of the pin 100 is received in opening 104 in the left hand end of the valve sleeve 34', which forms a counterpart for the valve sleeve 34 of FIG. 2. Thus the sleeve 34' and the pinion 14 move in unison although there is no net hydraulic force acting on the sleeve 34 in a right-hand direction. Because of the fact that pressure is distributed to the right-hand end of the sleeve as in the FIG. 2 construction, the pin connection between the sleeve 34' and the pinion 14' may be a loose fitting connection; and it functions in a fashion similar to the pin and slot connection shown at 76 and 78 in FIG. 2.

The other elements of the valve structure shown in FIG. 6 have counterpart elements in the FIG. 2 structure, and for this reason corresponding elements of each figure are shown by the same reference numerals although prime notations have been added to the FIG. 6 construction. The lost motion connection between the driving shaft 40 and the pinion 14 is shown in FIG. 6A. This connection is similar to the one described in FIG. 2A. For this reason similar numerals have been used to designate the common elements although prime notations have been added to the FIG. 6A construction.

Having described preferred forms of my invention, what I claim and desire to secure by U.S. Letters Patent is:

1. In a power steering system for an automotive vehicle, a driven member and a torque input member coaxially disposed with respect to said driven member, the improvement comprising:
  a valve mechanism comprising a valve sleeve situated over said torque input member;
  a torsion rod connection between said input member and said driven member;
  a mechanical connection between said driven member and said sleeve;
  a first rotary valve element having external valve lands carried by said input member;
  internal rotary valve lands formed in said sleeve, said internal and external valve lands registering one with respect to the other;
  first and second pressure ports in said valve sleeve adapted to communicate respectively with separate working pressure passages in said power steering system;
  a high pressure inlet port in said sleeve communicating with said valve lands, said valve lands being adapted to distribute fluid pressure selectively from said inlet port to said pressure ports as said input shaft is moved relative to said driven member;
  a central passage formed in said torque input member, a return passage located between said valve sleeve and said driven member, said return passage and said inlet port communicating with the interior of said torque input member;
  the end of said sleeve remote from said driven member being in communication with the interior of said torque input member, the net effective pressure force acting on said sleeve being directed toward said driven member;
  the torsion rod connection between said torsion rod and said driven member and the mechanical connection between said driven member and said sleeve include a common pin extending radially through one end of said driven member and through one end of said torsion rod, the end of said sleeve adjacent said driven member having an opening formed therein for receiving the radially outward end of said pin, the torque input member and an adjacent end of said driven member having engageable parts that define a lost-motion connection therebetween that accommodates limited relative angular displacement between said torque input member and said driven member within angular displacement limits whereby torque is transmitted from said torque input member to said driven member through said torsion rod as said torsion rod is deflected under torque in an established range within said limits and whereby torque is transmitted through said engageable parts when said torque exceeds said range.

* * * * *